United States Patent [19]
Brambilla

[11] Patent Number: 5,946,983
[45] Date of Patent: Sep. 7, 1999

[54] HYDROSTATIC MECHANICAL POWER TRANSMISSION SYSTEM PARTICULARLY HYDROMECHANICAL TRANSMISSION FOR INDUSTRIAL AND FARMING MACHINES AND VEHICLES IN GENERAL

[75] Inventor: Alberto Brambilla, Rodengo Saiano, Italy

[73] Assignee: Clark Hurth Components S.p.A., Arco, Italy

[21] Appl. No.: 08/887,171

[22] Filed: Jul. 2, 1997

[30] Foreign Application Priority Data

Sep. 3, 1996 [IT] Italy ................................ MI96A1817

[51] Int. Cl.$^6$ .................................................. F16H 47/02
[52] U.S. Cl. .......................... 74/730.1; 74/720; 180/307; 60/438
[58] Field of Search ............................... 74/730.1, 731.1, 74/732.1, 720; 180/305, 307; 60/437, 438

[56] References Cited

U.S. PATENT DOCUMENTS

| | | | |
|---|---|---|---|
| 3,213,712 | 10/1965 | Swift | 74/730.1 |
| 3,255,589 | 6/1966 | Ebert | 74/731.1 X |
| 4,750,381 | 6/1988 | Yasuo et al. | |
| 4,895,049 | 1/1990 | Kita et al. | 74/720 X |
| 5,193,496 | 3/1993 | Kanayama | 74/730.1 X |
| 5,329,828 | 7/1994 | Hurth | 74/730.1 X |
| 5,803,856 | 9/1998 | Lino et al. | 74/730.1 X |

FOREIGN PATENT DOCUMENTS

| | | |
|---|---|---|
| 0 141 605 | 5/1985 | European Pat. Off. . |
| 0 719 968 | 7/1996 | European Pat. Off. . |
| 2 274 837 | 1/1976 | France . |

*Primary Examiner*—Charles A Marmor
*Assistant Examiner*—Ankur Parekh
*Attorney, Agent, or Firm*—Guido Modiano; Albert Josif

[57] ABSTRACT

A power transmission system, particularly a hydrostatic-mechanical power transmission system for industrial and farming vehicles and the like, comprising a first train of constantly meshed gears which are adapted to selectively connect, through a first pair of clutch units, the prime mover (of the vehicle) to a hydrostatic pump and/or to a hydrostatic motor; and a second train of gears which are adapted to selectively connect, through a second pair of clutch units, the hydrostatic motor or the pump to the output shaft, thus providing a hydrostatic continuously variable transmission (CVT) known in the art as I$^2$. A mechanical transmission with two or more speed ratios is provided downstream of the hydrostatic transmission and, in addition to duplicating the speed interval of the hydrostatic unit several times, it allows to provide, one or more times, two purely mechanical speed ranges by alternately closing one of the first pair of clutch units and the contiguous clutch unit of the second pair and then closing the other two. When the second clutch unit of the first pair is also closed under mechanical power transmission, a hydrostatic braking condition is produced which can be modulated by adjusting the displacements of the hydrostatic pump and of the hydrostatic motor, which are rotated simultaneously.

20 Claims, 1 Drawing Sheet

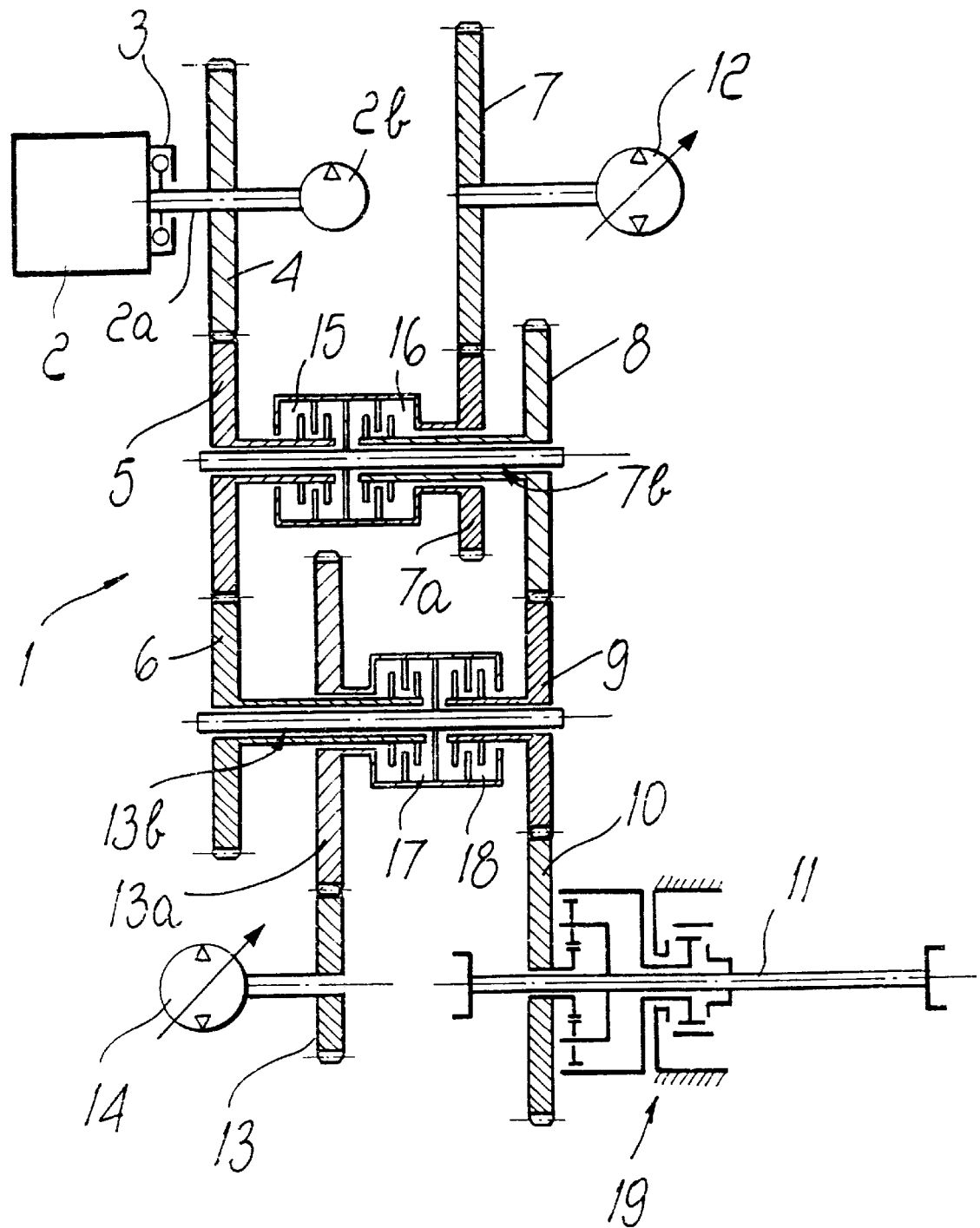

HYDROSTATIC MECHANICAL POWER TRANSMISSION SYSTEM PARTICULARLY HYDROMECHANICAL TRANSMISSION FOR INDUSTRIAL AND FARMING MACHINES AND VEHICLES IN GENERAL

BACKGROUND OF THE INVENTION

The present invention relates to a power transmission system, particularly to a hydromechanical transmission for self-propelled machines, such as industrial and farming vehicles and similar machines.

It is known that various hydromechanical transmissions have already been devised for vehicles and machines assigned to special tasks, such as backhoes, loaders, excavators, container carriers, lifting cranes, farming machines, and the like; all these transmissions have the purpose of distributing the usable power between a mechanical branch with gears and a hydrostatic branch (hydrostatic motor and hydrostatic pump), thus achieving the advantages offered by hydrostatic power transmission, which in practice allows great speed control, together with the advantages provided by purely mechanical power transmission, which in practice offers high efficiency and reliability.

However, these hydromechanical transmissions are not always able to provide a range of reduction ratios such as required by the above-mentioned machines; therefore, in order to obviate this drawback, one or more reduction units with a high number of speed ranges are associated at the output of the hydromechanical transmission; this obviously entails a considerable effect on costs, complexity, and overall bulk.

As an alternative to these hydromechanical transmissions, a type of CVT transmission (i.e., a continuously variable transmission known to technicians as $I^2$) has already been proposed which substantially uses four clutches arranged in pairs on opposite sides of a CVT unit, for example a hydrostatic unit constituted by a hydrostatic motor and by a corresponding hydrostatic pump, both having a variable and adjustable volume or displacement, so as to be able to initially connect the pump to the power source (generally a Diesel engine) and the hydrostatic motor to the output shaft (transmission shaft) and then, when the hydrostatic motor reaches its maximum speed, to connect, by means of the second pair of said clutches, said hydrostatic motor to the power source (Diesel), making it work like a hydrostatic pump, and simultaneously so as to be able to connect the pump to the output shaft, reducing its displacement until its maximum rotation rate is reached.

This type of hydrostatic transmission therefore allows to shift from the minimum speed to the maximum speed by appropriately adjusting the displacement of the pump and of the hydrostatic motor; in practice, however, its total "range" is not always sufficient for certain industrial vehicles, which must travel on roads and comply with set speed limits.

SUMMARY OF THE INVENTION

Accordingly, a principal aim of the present invention is to provide a hydromechanical transmission for industrial vehicles and the like, conceived so that, while using the system known as $I^2$, i.e., a continuously variable transmission with four clutches arranged at the opposite ends of a hydrostatic motor-pump assembly, it is capable of overcoming the overall range limits of this type of hydrostatic transmission and is also capable of allowing medium- and high-speed field wherein the transmission behaves exclusively like a mechanical transmission, such as to allow vehicle travel speeds which are adapted for all uses and tasks of said vehicle and also allow braked locking of the vehicle during parking.

Another object of the invention is to provide a hydrostatic-mechanical transmission system which is structurally simple, compact, and highly reliable.

A further object is to provide a hydrostatic-mechanical transmission by using components which are easily commercially available and have a low cost, such as to not affect the overall cost of the system.

This aim, these objects, and others which will become apparent from the following description are achieved by a system constituted, according to the present invention, by a prime mover, substantially a Diesel engine or the like directly connected to the first gear of a train of gears which are adapted to selectively connect, by means of a pair of said clutches, the prime mover to said pump and/or to said hydrostatic motor, and by a second train of gears which are adapted to selectively connect, by means of another pair of said clutches, the output shaft (output transmission shaft) to said hydrostatic pump or to said hydrostatic motor, thus providing a hydrostatic transmission; a mechanical transmission with at least two speed ratios, being also provided at the output of said hydrostatic transmission, which allow connection, through the selective actuation of said clutches, of the prime mover directly to the output gear and therefore to provide at least two purely mechanical speed ranges functionally after the hydrostatic stage, simultaneously making said pump and said hydrostatic motor alternately rotate in conditions in which they have substantially zero displacement.

More particularly, said mechanical transmission arranged on the output of said hydrostatic transmission is provided with preferably more than two speed ratios (speed ranges), so as to provide low speeds by means of the selective closure of the clutches and of the adjustment of the displacements of the pump and of the hydraulic motor, and then provide high speeds by means of a purely mechanical transmission and more specifically a first reduced-speed range by closing one pair of clutches and a second speed range, optionally of the overdrive type, by closing the other pair of clutches.

Moreover, if said two pairs of selective clutches are constituted by disk clutches, with stable spring-loaded closure and hydraulic opening, the system can be used as a parking brake (S.A.H.R. brake) without pressure.

BRIEF DESCRIPTION OF THE DRAWINGS

Further characteristics and advantages of the present invention will become apparent from the following detailed description, given with reference to the only FIGURE, which schematically illustrates, partially as a block diagram, the system constituting the hydromechanical transmission according to the invention.

DESCRIPTION OF THE PREFERRED EMBODIMENTS

With reference to the above FIGURE, the hydromechanical transmission according to the invention is substantially constituted by a box-like body for containing the gears and the corresponding clutches or actuators, not shown, by a hydrostatic motor, by a hydrostatic pump, and by a mechanical transmission with two or more speed ranges. Said transmission can be connected to the shaft of a power source, for example a Diesel engine.

More particularly, said transmission, generally designated by the reference numeral 1, is directly connected to the prime mover 2 by means of a conventional torsional vibration damping unit 3, known as flexible coupling; the shaft 2a of the prime mover 2 is connected for example to an auxiliary pump 2b and to the first gear 4 of a train of mutually meshing gears constituted by said gear 4 and by the gears 5 and 6, said transmission also having a second train of gears 8, 9, and 10 which mutually mesh at all times. The output is integral with the last gear 10.

A conventional hydrostatic pump 12 with variable displacement is mounted integral with the shaft of another gear 7 arranged between the two gear trains; the shaft of a hydrostatic motor 14, also of a conventional type and with variable or fixed displacement, is integral with the shaft of another gear 13 being intermediate to said two trains.

A further gear 7a meshes with the gear 7, is jointly coupled to the pump, and is mounted integral with the rotation shaft 7b which rotatably supports the two opposite gears 5 and 8, which can be connected to said shaft 7b by means of the clutches 15 and 16; likewise, a gear 13a is arranged so as to mesh with the gear 13, jointly coupled to the hydrostatic motor 14, and is mounted integral with the shaft 13b which rotatably supports the two opposite gears 6 and 9, which can be connected to said shaft 13b by means of the clutches 17 and 18.

The two clutches, generally designated by the reference numerals 15 and 16 respectively, are arranged on the shaft of the two opposite gears 5 and 8, and are constituted for example by clutch units of the type with multiple facing disks, wherein the disks of each clutch can be kept packed by pre-loaded springs and opened by hydraulic action.

Likewise, the two other clutch units, generally designated by the reference numerals 17 and 18 respectively, for example clutch units with multiple disks, which are likewise arranged mutually opposite and spring-loaded and can be kept packed by pre-loading and opened hydraulically, are interposed between the opposite gears 6 and 9.

The keying of the disks of each clutch on the respective shaft and on the cover that continues them is provided so that the closure of one clutch, for example the clutch 15, transmits motion (from the rotating gear 5) only to the gear 7a which is connected to the gear 7 that is jointly coupled to the pump, so that the gears 8, 9, and 10 remain disconnected from the prime mover 2; likewise, the closure of the clutch 17 and the opening of the opposite clutches causes the rotation (taken from the gear 6) only of the gears 13a and 13 and therefore also causes the rotation of the hydrostatic motor 14.

Therefore, the clutches 15 and 17, in closed position, allow to selectively rotationally connect the pump 12 and/or the hydrostatic motor 14 to the prime mover 2; the clutches 16 and 18 instead allow to connect the output gear 10 selectively to the pump 12 or to the hydrostatic motor 14.

Therefore, by acting selectively, as mentioned above, on said clutch units there is provided the principle of the hydrostatic transmission ($I^2$), i.e. of a continuously variable transmission which allows to shift, in two steps, from a minimum speed to a maximum speed, depending on the ratios between the displacements of the hydraulic components 12 and 14 used selectively as pump and then as motor.

Also according to the present invention, in order to allow a better performance to the purely hydrostatic type of transmission, which conventionally has an efficiency and a range (example of speed interval) that is not always sufficient for certain machines meant not only for stationary work but also for road or off-road travel, for which higher speeds than provided by conventional hydrokinetic transmissions are allowed, a mechanical transmission with at least two and preferably more than two speed ratios, generally designated by the reference numeral 19 in the above FIGURE, and in which the gear 10 for output from the $I^2$ transmission is its power input, is associated with the output shaft 11 of the hydrostatic transmission described above in detail.

Use of said power transmission with multiple speeds or speed ranges allows in practice to use the hydrostatic transmission at rather low speeds by means of the selective use of the clutch units 15–18 and 17–16 and of the simultaneous adjustment of the displacements of the pump and of the hydrostatic motor, whilst at higher speeds the mechanical transmission 19 allows to have a purely mechanical power transmission with a reduced speed range when the clutches 17 and 18 are closed (in which case power is transmitted by the gears 4, 5, 6, 9, and 10) and to have a faster speed range, for example an overdrive one, when the clutch units 15 and 16 are closed.

Thus, for example, with a three-speed power transmission arranged downstream it is possible to achieve a dual $I^2$ hydrostatic stage between 2 and 19 km/h, a first two-speed mechanical interval between 19 and 38.2 km/h, and a second two-speed mechanical interval between 38.2 and 76 km/h.

During purely mechanical transmission periods, the hydrostatic motor or hydrostatic pump assembly are rotated alternately in zero-displacement conditions, therefore without excessive energy consumption.

Moreover, in the mechanical period, for example when the clutch units 17 and 18 are closed, it is also possible to close the clutch unit 15, providing a constant mechanical ratio between the pump and the hydrostatic motor and therefore also allowing to use the hydrostatic power transmission (pump plus motor) as a retarder, adjusting the displacement of the hydraulic pump and motor. As an alternative, it is possible to use the clutch unit 17 when the clutch units 15 and 16 are closed.

The downstream transmission 19 does not simply duplicate the speed interval of the hydrostatic unit several times; rather, it has the purpose of separating a first interval of low speeds, wherein power is transmitted purely by hydrostatic means in order to achieve rapid transients with perfect speed control, from a second interval of high speeds, wherein power is transmitted purely by mechanical means, in order to achieve steady-state conditions with excellent efficiencies, wherein speed variation is entrusted to the useful rpm range of the power source.

In practice, it has been observed that through an appropriate choice of the ratios between the number of teeth of the various mutually meshing gears and with a mechanical power transmission having two speed ranges it has been possible to provide a maximum speed of over 62 km/h for a machine such as a power loader with a standard bucket and with an empty weight of 14 tons, with a Diesel engine having a conventional power rating (for example 120 kW); accordingly, the hydromechanical power transmission according to the present invention, with an appropriate choice of the speed ratios of the gears that compose it, can allow industrial vehicles to reach maximum speeds that allow said vehicles to travel even on off-road routes; in other words, the full-power conversion ratio of the hydromechanical power transmission can be calculated so as to be sufficient to cover the requirements of all the vehicles mentioned earlier.

The invention thus conceived and illustrated is susceptible of numerous functional and structural modifications and variations, all of which are within the scope of the inventive concept; likewise, the materials employed, the dimensions chosen, and the shapes of the components of the above described power transmission can vary according to requirements.

What is claimed is:

1. A hydrostatic-mechanical power transmission system for self-propelled machines comprising:

a hydrostatic unit formed by a hydrostatic motor with an output and a hydrostatic pump with an output;

a first train of mutually meshing gears including an input gear connectable to a prime mover for being driven by said prime mover;

a second train of mutually meshing gears including an output gear connectable to an output shaft;

a first rotation shaft arranged to rotatably support a first gear of said first train of gears and to rotatably support a first gear of said second train of gears;

a second rotation shaft arranged to rotatably support a second gear of said first train of gears and to rotatably support a second gear of said second train of gears;

a first clutch assembly for selectively connecting the output of said hydrostatic motor said first gears of said first and second trains of gears;

a second clutch assembly for selectively connecting the output of said hydrostatic motor to said second gears of said first and second trains of gears.

2. A transmission according to claim 1, wherein said said first clutch assembly comprises a first clutch for selectively connecting the output of said hydrostatic pump to said first gear of said first gear train, and a second clutch for selectively connecting the output of said hydrostatic pump to said first gear of said second gear train, and wherein said second clutch assembly comprises a third clutch for selectively connecting the output of said hydrostatic motor to said second gear of said first gear train, and a fourth clutch for selectively connecting the output of said hydrostatic motor of said second gear of said second gear train.

3. A transmission according to claim 1, further comprising a first intermediate gear assembly operatively connected between said first clutch assembly and the output of said hydrostatic pump, and a second intermediate gear assembly operatively connected between said second clutch assembly and the output of said hydrostatic motor.

4. A transmission according to claim 1, wherein said hydrostatic motor is a variable-displacement hydrostatic motor.

5. A transmission according to claim 1, wherein said hydrostatic motor is a fixed-displacement hydrostatic motor.

6. The transmission of claim 1, wherein said first gear of said first train of gears is arranged to intermesh between said input gear of said first train of gears and said second gear of said first train of gears, and wherein said second gear of said second train of gears is arranged to intermesh between said first gear of said second train of gears and said output gear of said second train of gears.

7. The transmission of claim 6, wherein said first clutch assembly comprises a first clutch for selectively connecting the output of said hydrostatic pump to said first gear of said first gear train, and a second clutch for selectively connecting the output of said hydrostatic pump to said first gear of said second gear train, and wherein said second clutch assembly comprises a third clutch for selectively connecting the output of said hydrostatic motor to said second gear of said first gear train, and a fourth clutch for selectively connecting the output of said hydrostatic motor to said second gear of said second gear train.

8. The transmission of claim 6, further comprising a first intermediate gear assembly operatively connected between said first clutch assembly and the output of said hydrostatic pump, and a second intermediate gear assembly operatively connected between said second clutch assembly and the output of said hydrostatic motor.

9. The transmission of claim 6, further comprising a first intermediate gear assembly operatively connected between said first clutch assembly and the output of said hydrostatic pump, and a second intermediate gear assembly operatively connected between said second clutch assembly and the output of said hydrostatic motor, and wherein said first clutch assembly comprises a first clutch for selectively connecting the output of said hydrostatic pump to said first gear of said first gear train, and a second clutch for selectively connecting the output of said hydrostatic pump to said first gear of said second gear train, and wherein said second clutch assembly comprises a third clutch for selectively connecting the output of said hydrostatic motor to said second gear of said first gear train, and a fourth clutch for selectively connecting the output of said hydrostatic motor to said second gear of said second gear train.

10. The transmission of claim 6, wherein said first and second rotation shafts extend along mutually parallel axes, and wherein the gears of said first train gears rotate in a first plane extending substantially perpendicularly to said mutually parallel axes of said first and second rotation shafts, and the gears of said second train gears rotate in a second plane spaced from said first plane and extending substantially perpendicularly to said mutually parallel axes of said first and second rotation shafts.

11. The transmission of claim 1, further comprising a first intermediate gear assembly operatively connected between said first clutch assembly and the output of said hydrostatic pump, and a second intermediate gear assembly operatively connected between said second clutch assembly and the output of said hydrostatic motor, and wherein said first clutch assembly comprises a first clutch for selectively connecting the output of said hydrostatic pump to said first gear of said first gear train, and a second clutch for selectively connecting the output of said hydrostatic pump to said first gear of said second gear train, and wherein said second clutch assembly comprises a third clutch for selectively connecting the output of said hydrostatic motor to said second gear of said first gear train, and a fourth clutch for selectively connecting the output of said hydrostatic motor to said second gear of said second gear train.

12. A hydrostatic-mechanical power transmission system in combination with an input prime mover and an output mechanical transmission, comprising:

a hydrostatic motor with an output;

a hydrostatic pump with an output;

a first train of mutually meshing gears including an input gear connected to said input prime mover for being driven by said input prime mover;

a second train of mutually meshing gears including an output gear connected to an output shaft of said mechanical transmission;

a first rotation shaft arranged to rotatably support a first gear of said first train of gears and to rotatably support a first gear of said second train of gears;

a second rotation shaft arranged to rotatably support a second gear of said first train of gears and to rotatably support a second gear of said second train of gears;

a first clutch assembly for selectively connecting the output of said hydrostatic pump to said first gears of said first and second trains of gears; and a second clutch assembly for selectively connecting the output of said hydrostatic motor to said second gears of said first and second trains of gears.

13. The combination of claim 12, wherein said mechanical transmission has more than two speed ratios to provide multiple intervals with hydrostatic drive and multiple intervals with purely mechanical drive.

14. The combination of claim 12, wherein said first clutch assembly comprises a first clutch for selectively connecting the output of said hydrostatic pump to said first gear of said first gear train, and a second clutch for selectively connecting the output of said hydrostatic pump to said first gear of said second gear train, and wherein said second clutch assembly comprises a third clutch for selectively connecting the output of said hydrostatic motor to said second gear of said first gear train, and a fourth clutch for selectively connecting the output of said hydrostatic motor to said second gear of said second gear train.

15. The combination of claim 12, further comprising a first intermediate gear assembly operatively connected between said first clutch assembly and the output of said hydrostatic pump, and a second intermediate gear assembly operatively connected between said second clutch assembly and the output of said hydrostatic motor.

16. The combination of claim 12, wherein said first gear of said first train of gears is arranged to intermesh between said input gear of said first train of gears and said second gear of said first train of gears, and wherein said second gear of said second train of gears is arranged to intermesh between said first gear of said second train of gears and said output gear of said second train of gears.

17. The combination of claim 16, wherein said first clutch assembly comprises a first clutch for selectively connecting the output of said hydrostatic pump to said first gear of said first gear train, and a second clutch for selectively connecting the output of said hydrostatic pump to said first gear of said second gear train, and wherein said second clutch assembly comprises a third clutch for selectively connecting the output of said hydrostatic motor to said second gear of said first gear train, and a fourth clutch for selectively connecting the output of said hydrostatic motor to said second gear of said second gear train.

18. The combination of claim 16, further comprising a first intermediate gear assembly operatively connected between said first clutch assembly and the output of said hydrostatic pump, and a second intermediate gear assembly operatively connected between said second clutch assembly and the output of said hydrostatic motor.

19. The combination of claim 16, further comprising a first intermediate gear assembly operatively connected between said first clutch assembly and the output of said hydrostatic pump, and a second intermediate gear assembly operatively connected between said second clutch assembly and the output of said hydrostatic motor, and wherein said first clutch assembly comprises a first clutch for selectively connecting the output of said hydrostatic pump to said first gear of said first gear train, and a second clutch for selectively connecting the output of said hydrostatic pump to said first gear of said second gear train, and wherein said second clutch assembly comprises a third clutch for selectively connecting the output of said hydrostatic motor to said second gear of said first gear train, and a fourth clutch for selectively connecting the output of said hydrostatic motor to said second gear of said second gear train.

20. The combination of claim 12, further comprising a first intermediate gear assembly operatively connected between said first clutch assembly and the output of said hydrostatic pump, and a second intermediate gear assembly operatively connected between said second clutch assembly and the output of said hydrostatic motor, and wherein said first clutch assembly comprises a first clutch for selectively connecting the output of said hydrostatic pump to said first gear of said first gear train, and a second clutch for selectively connecting the output of said hydrostatic pump to said first gear of said second gear train, and wherein said second clutch assembly comprises a third clutch for selectively connecting the output of said hydrostatic motor to said second gear of said first gear train, and a fourth clutch for selectively connecting the output of said hydrostatic motor to said second gear of said second gear train.

* * * * *